United States Patent
Egner-Walter et al.

[11] Patent Number: 6,119,302
[45] Date of Patent: Sep. 19, 2000

[54] WIPER BLADE WITH REPLACEABLE WIPER BLADE RUBBER FOR A VEHICLE WINDSCREEN WIPER

[75] Inventors: Bruno Egner-Walter, Heilbronn; Eckhardt Schmid, Brackenheim; Wolfgang Scholl, Gemmrigheim; Klaus Jaisle, Leingarten, all of Germany

[73] Assignee: ITT Manufacturing Enterprises, Inc., Wilmington, Del.

[21] Appl. No.: 09/051,172

[22] PCT Filed: Jul. 3, 1996

[86] PCT No.: PCT/EP96/02913

§ 371 Date: Jun. 16, 1998

§ 102(e) Date: Jun. 16, 1998

[87] PCT Pub. No.: WO97/12789

PCT Pub. Date: Apr. 10, 1997

[30] Foreign Application Priority Data

Oct. 2, 1995 [DE] Germany .......................... 195 36 744

[51] Int. Cl.[7] .................................................. B60S 1/38
[52] U.S. Cl. .................................. 15/250.44; 15/250.453
[58] Field of Search .................. 15/250.44, 250.451, 15/250.452, 250.453, 250.454, 250.46, 250.38, 250.361, 250.31, 250.48

[56] References Cited

FOREIGN PATENT DOCUMENTS

| | | |
|---|---|---|
| 0490833 | 6/1992 | European Pat. Off. . |
| 1237684 | 6/1960 | France ............................. 15/250.452 |
| 2681025 | 3/1993 | France . |
| 1994938 | 10/1968 | Germany . |
| 2253558 | 5/1974 | Germany ............................ 15/250.2 |
| 2505176 | 8/1976 | Germany ......................... 15/250.453 |
| 8911642 | 3/1991 | Germany . |
| 9207915 | 10/1992 | Germany . |
| 9314333 | 12/1993 | Germany . |

*Primary Examiner*—Gary K. Graham
*Attorney, Agent, or Firm*—J. Gordon Lewis

[57] ABSTRACT

A wiper squeegee is mounted in the holding claws of a support frame. The capability of the wiper squeegee to shift in the longitudinal direction is limited by a fixed first stop on a first end of the support frame and a second stop which can move between a holding position and a release position on a second end of the support frame. An end piece on which the second stop is mounted is fastened on the second end of the support frame so that the end piece can rotate around a geometric axis which runs at least approximately parallel to the longitudinal direction of the wiper squeegee. This end piece can be locked, at least in the holding position.

35 Claims, 4 Drawing Sheets

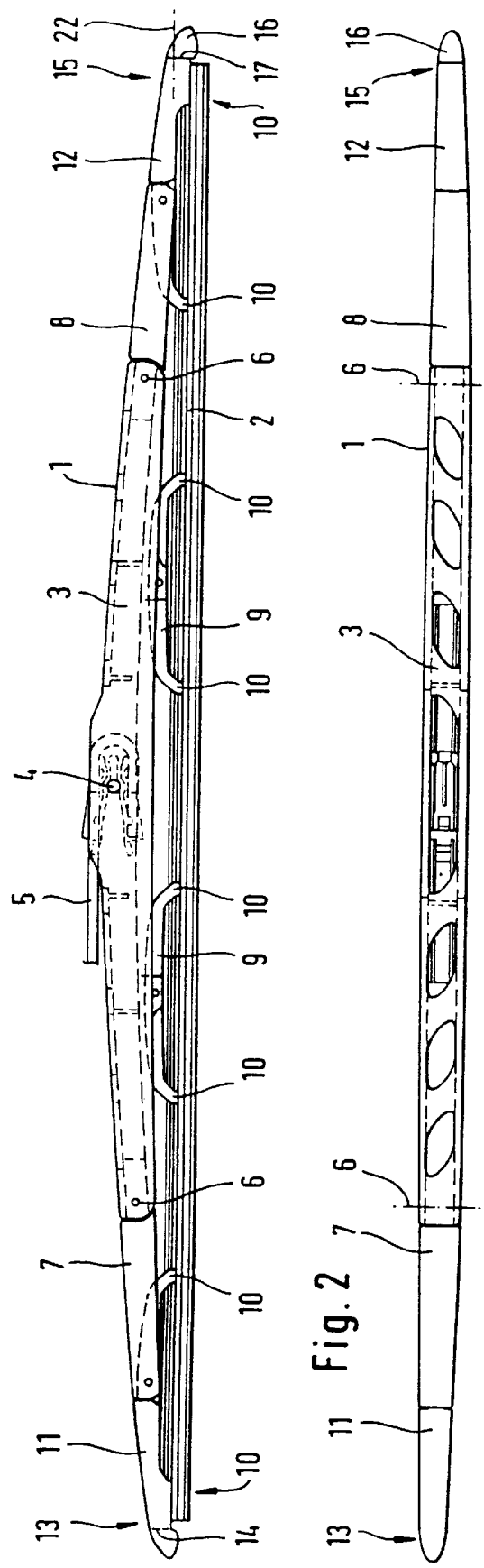
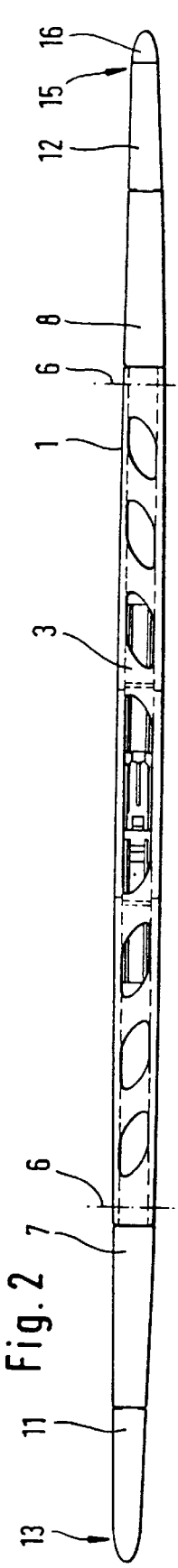
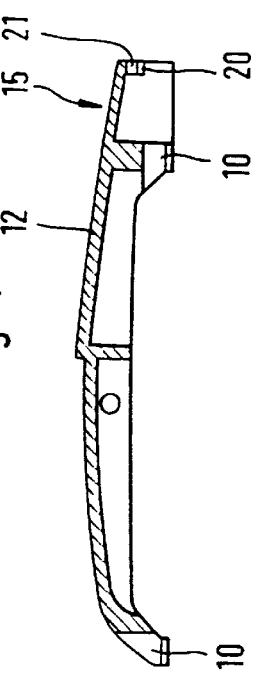
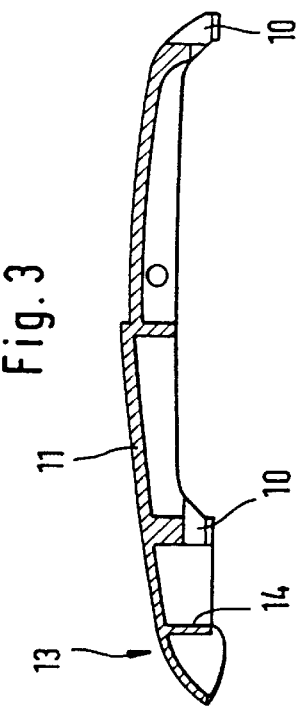

WIPER BLADE WITH REPLACEABLE WIPER BLADE RUBBER FOR A VEHICLE WINDSCREEN WIPER

BACKGROUND OF THE INVENTION

The invention relates to a wiper blade with replaceable wiper squeegee for an automotive windshield wiper.

In German Utility Model DE 9,116,994.1 U1, a wiper blade is described for which a wiper squeegee produced by extrusion with a reinforcing strip embedded in its head piece is held, so as to be freely shiftable in its longitudinal direction, by the holding claws of a support frame. The support frame consists of a higher-level and an lower-level support, which are connected with one another rotatably around an axis running transversely. The supports of the support frame are made of plastic and the higher-level support is also hinged, rotatably around a transverse axis, to a wiper arm made of plastic. To limit to the necessary extent the longitudinal shifting of the wiper squeegee in the holding claws of the support frame, on the inner end of the wiper blade a stop is integrally molded onto the support; the stop extends downward from the spine of the support and stands opposite to the end of the wiper squeegee. On the outer end of the support frame, a second stop is provided, which stands opposite the other end of the wiper squeegee. This second stop is located on a special end piece made of plastic, which is mounted on the outer end of the relevant support to swivel around a geometric axis running transversely to the wiper squeegee between a hold position and a release position. On two parallel flaps which represent an elongation of the outsides of the end pieces, in each case, a hinge pin, directed inward, is mounted rotatably in an assigned bearing seat at the end of the support. In addition, by means of a special spring blade on the end piece, which acts together with a corresponding counter stop plate on the support, an automatic locking of the end piece is accomplished in the extended holding position. In the end piece with the second stop, to a certain extent the form of the support is continued, so that the second stop is directed downwards from the spine of the end piece.

To replace the wiper squeegee, while overcoming the locking force, the end piece is swivelled into a release position angled upwards. Now the worn-out squeegee can be drawn out in the longitudinal direction from the holding claws of the support and a new wiper squeegee can be shifted on in the opposite direction into the holding claws. Then the end piece is again swivelled back into its extended holding position. Here the catch spring on the end piece engages automatically in a form developed on the support and serving as a counter stop. In this way the end piece is automatically locked into its extended holding position.

The rotary movement of the end piece with respect to the second stop necessary for replacement of the wiper squeegee takes place in a plane in the longitudinal direction of the wiper blade or of the wiper squeegee. The wiper squeegee is also mounted, in the holding claws of the support frame, to shift in the longitudinal direction. When the windshield wiper is in operation, the wiper arm executes a pendulum swinging movement around the wiper shaft. Here it can occur that the wiper squeegee, during this pendulum-swinging movement, is shifted in the direction of the wiper blade opposite to the wiper shaft and is pressed against the second stop located on the end piece. Thus there is a danger that in this way, the end piece, because of the force of the wiper squeegee pressing upon the second stop, will be swivelled out of its holding position, and this, in its longitudinal direction, releases the wiper squeegee. This danger is particularly present when the spring force of the catch spring on the end piece has diminished as a result of a number of replacements of the wiper squeegee or because the material has aged. The wiper squeegee can, without this being intended, slide out, at least partially, from the holding claws of the support, and this could be hazardous.

The object of the invention is to improve a wiper blade of the type described above.

SUMMARY OF THE INVENTION

According to the invention, the object is achieved by a wiper blade with a second stop located on a special end piece, which is, in its holding position or release position, rotatable around a geometric axis running at least approximately parallel to the longitudinal direction of the wiper squeegee. Thus a situation is guaranteed whereby a force of the wiper squeegee acting on the second stop in the longitudinal direction of the wiper squeegee is not capable of moving the end piece or the second stop from its holding position into the release position for the wiper squeegee. This excludes, with certainty, a situation in which the wiper squeegee, during operation of the windshield wiper, can slip out of the holding claws of the support or support frame (without this being intended), thus creating a hazard.

Since in general an elongated wiper blade of the type described in the introduction is higher than it is wide, an embodiment of the invention considered advantageous, whereby the geometric axis around which the end piece with the second stop is mounted rotatably relative to the support or support frame of the wiper blade, runs centrally above the wiper squeegee, and the second stop extends at right angles to this geometric axis. This setup of the geometric axis guarantees optimum utilization of the spatial relationships found on such a wiper blade. In connection with this setup of the geometric axis, in addition, it is advantageous that, the end piece can be brought from its holding position into its release position, or the reverse, by a 180° rotation. If here, in addition, the end piece is shaped so that the height of the second stop between the geometric axis and its underside or the underside of the end piece is greater than the distance between the geometric axis and the upper side of the wiper squeegee, and so that, in addition, the opposite height of the second stop between the geometric axis and its upper side or the upper side of the end piece is smaller than the distance between the geometric axis and the upper side of the wiper squeegee, a structure is achieved which is such that the form and magnitude of the second end of the support or of the support frame, with the rotatable end piece, can essentially correspond to the form and magnitude of the opposite first end of the support or of the support frame with the fixed, first stop. In other words, this means that the space and magnitude relationships of the wiper blade can be utilized optimally, and that it is not necessary to enlarge the second end of the support or the support frame with the movable end piece.

A simple and attractive form of the wiper blade can be achieved as follows: The form of the end piece with the second stop, at least to a great extent, corresponds to the first form of the first end of the support frame with the first stop and thus is adapted to the form of the second end of the support frame. Here the design of the wiper blade is optimal, when, in the holding position of the second stop or of the end piece, the outer surface of the second end of the support frame grades directly and without a gap into the outer surface of the end piece. This is achieved as follows: the edges lying opposite one another, which are formed on the one hand by the outer surface and the front surface of the second end of the support frame and, on the other hand, by the outer surface and the front surface of the end piece adjoining the second end of the support frame, are formed with sharp edges and adjoin one another immediately. This has, in addition, the advantage that the bristles of a carwash machine cannot penetrate into a crack or a recess between the two ends of the support frame and the end piece and be caught there.

To prevent a situation in which the bristles of a carwash machine grip onto the end piece and can, without this being intended or noticed, move the end piece into the release position, an embodiment is recommended, according to which the underside of the end piece has a convex form. Bristles striking this thus glide off to the side and find no possibility of engagement. Essentially for stylistic reasons, in such a case the underside of the opposite end of the support frame should also be convex.

For a stable and sufficiently secure rotatable fastening of the end piece to the second end of the support frame, according to an advantageous embodiment, a rib, or partition is provided on the second end of the support frame, transversely to the longitudinal direction of the wiper squeegee, and the end piece is connected with this rib or partition so as to rotate around the geometric axis. For this purpose, an embodiment is recommended, whereby the end piece is connected across a hinge pin with this rib or partition, and this hinge pin is rotatably mounted in a through-hole. Here the hinge pin can either be fastened onto the end piece and the through-hole can be in the rib or in the partition on the second end of the support frame, or vice versa. So that such a connection of the end piece with the second end of the support system can be easy to assemble, this should be designed as a theft-proof locking connection. Such a connection can be relatively easily achieved as follows: The hinge pin penetrates through the through-hole and the free end of the hinge pin protruding beyond the through-hole is designed to be thicker. In order, in such a case, to be able to insert the hinge pin into the through-hole in the rib or partition, two fundamental design variants can be recommended as advantageous. One variant that the through-hole in the rib has a radial opening of such a nature that the hinge pin is to be inserted with locking in the radial direction into the through-hole. The radial opening of the through-hole is designed so that it is fitted with opposing locking projections which, when the hinge pin penetrates, transiently yield elastically and then can resume their normal position. The other variant provides that the through-hole with the rib has a closed circumference. In order to be able, in this case, to introduce the hinge pin (whose free end is thickened and thereby acts as a stop) in the axial direction into the through-hole, appropriate yielding slits are provided in the hinge pin from the free end in the axial direction. These yielding slits are formed so that the free end of the hinge pin can temporarily be compressed to a cross-section that is smaller than or equal to the cross section of the through-hole. When the end piece is assembled, the hinge pin is thus introduced into the through-hole in the axial direction. At the end of this procedure, the thickened end of the hinge pin on the rear side of the rib protrudes out of the through-hole, and because of the elastic restoring force it assumes a stop position in which the thickened end of the hinge-pin point engages behind the rear side of the rib.

Additional advantageous embodiments and details of the invention are described in more detail in the following examples of embodiments.

BRIEF DESCRIPTION OF THE DRAWINGS

In the drawings,

FIG. 1 shows a side view of a wiper blade according to the invention;

FIG. 2 shows a top view of a wiper blade;

FIG. 3 shows a longitudinal section of the outer claw support, which forms the end of the support frame;

FIG. 4 shows a longitudinal section of the claw support, which forms the second end of the support frame;

DETAILED DESCRIPTION OF THE DRAWINGS

Figure 6:
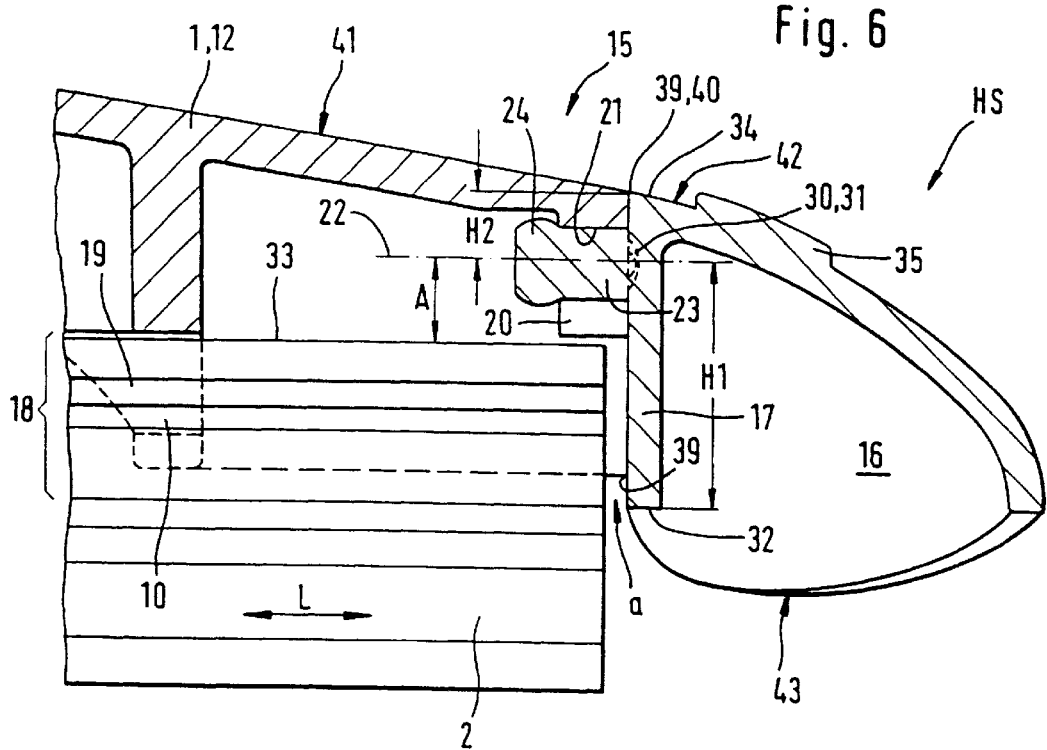
FIG. 6 shows the section VI—VI of FIG. 5, with end piece in the holding position (HS)

The wiper blade shown in FIGS. 1 and 2 essentially consists of a longitudinally elongated support frame 1, on whose underside a known wiper squeegee 2 is held and guided. The support frame 1 possesses a support 3, which, approximately in its middle region is to be connected rotatably with the wiper arm 5 of an automotive windshield wiper, across a joint bolt 4 running transversely. At the opposite ends of the support 3 a first intermediate support 7 and a second intermediate support 8 are hinged, each rotating around an axis 6 running transversely. On the inner ends of each of the first and the second intermediate support 8 an inner claw support with the holding claws 10 is hinged. In addition, an outer claw support 11, which also possesses holding claws 10, is hinged to the outer end of the first intermediate support 7, and another outer claw support 12, which also has holding claws 10, is hinged to the outer end of the second intermediate support 8. Support 3 as well as the intermediate supports 7, 8 and the claw supports 9, 11, 12 are U-shaped in cross section, and in the region of their hinge points in each case the lower-level support is mounted inside the cross-sectional profile of the higher-level support, and connected with this across a hinge pin. Here the hinge pin is in each case mounted in aligned boreholes in the supports and secured against shifting in the axial direction. It is advisable to lock the hinge pin against rotation on the lower-level support and to mount it rotatably on the higher-level support.

The outer claw support 11, on which the first end 13 of the support frame 1 is located, is provided with a stop 14, which is rigidly attached to the claw support 11 and stands opposite the end of the wiper squeegee 2. On the other outer claw support 12, on which the second end 15 of the support frame 1 is located, a special end piece 16 is fastened movably, and on this the second stop 17 for the wiper squeegee 2 is positioned.

The wiper squeegee 2 has a head piece 18, on whose underside the wiper lip proper is attached across a so-called tip strap. The wiper squeegee 2, in whose head piece 18 a lateral needle spring slide 19 is embedded, is, with its head piece 18, held and guided by the holding claws 10 of the support frame 1, in such a fashion that it is freely displaceable in its longitudinal direction L relative to the holding claws 10 in the area bounded by the first stop 13 [sic; 14] and the second stop 17 (see also FIG. 6).

It should also be pointed out that the entire support frame 1 of the wiper blade and the end piece 16 are manufactured from a suitable plastic. This results in an advantageous reduction of the weight compared with an embodiment in metal and, in addition, there are a larger number of design possibilities for the forms of the individual components.

In FIG. 3 the outer claw support 11 is shown in longitudinal section. Besides the holding claws 10, this shows especially the first stop 14, which on the first end 13 of the support frame is fastened rigidly to the claw support 11. The first stop 14 is, to a certain extent, a partition, which extends transversely to claw support 11 between its outer walls, which, in cross section, are shaped like a tunnel. The height of the first stop 14 is dimensioned so that the front side of the head piece 18 of the wiper squeegee 2 can strike it, and in this way the displaceability of wiper squeegee 2 in its longitudinal direction L is limited. The underside of the first end 13 of the support frame 1 is convex.

FIG. 4 shows the other outer claw support 12, on which the second end 15 of the support frame 1 is located. At an interval behind the outer holding claw 10, which corresponds at least approximately to the distance of the first stop 14 from the outer holding claw 10 on the outer claw support 11 (FIG. 3), on the outer claw support 12 there is a rib 20 running transversely to the longitudinal direction L of the wiper squeegee 2, which is mounted between the outer walls of the claw support 12 which is formed with a tunnel-like cross section. This rib 20 forms, to a certain extent, a front face at the end 15 of the support frame 1. It can also be seen that this rib 20 has a through-hole 21, which is coaxial with the geometric axis 22, and thus runs approximately parallel to the longitudinal direction L of wiper squeegee 2.

Various examples of embodiments for the design of the second end 15 of the support frame 1, with the end piece 16 attached to it, are described in the following in more detail, with reference to the FIGS. 5 through 8b.

Figure 5:
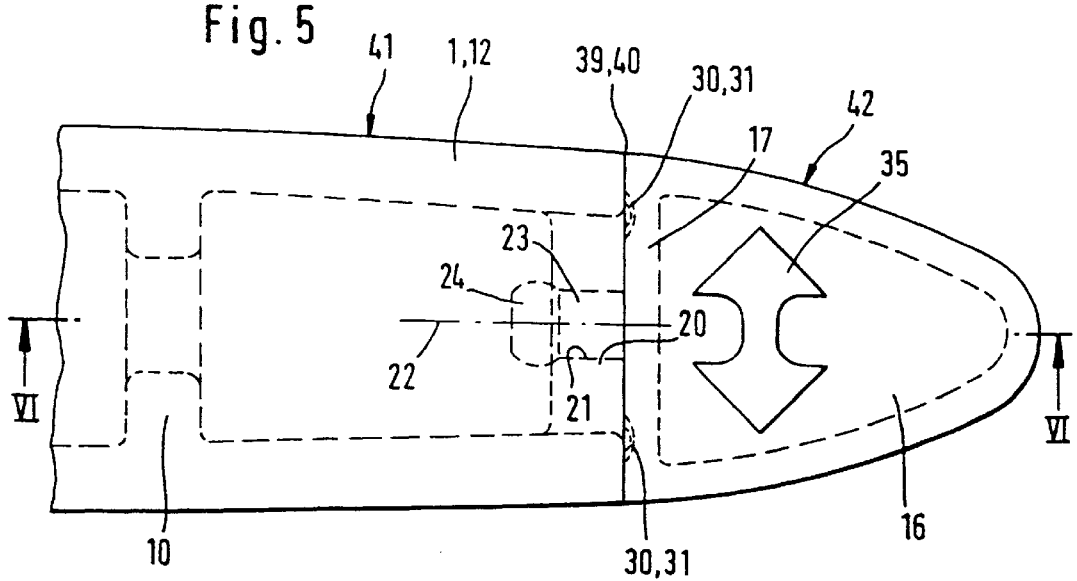
FIG. 5 shows a top view of an example of an embodiment of the second end of the support frame, in an enlargement.

FIGS. 5 and 6 show the second end 15 of the support frame 1, which is located on the outer claw support 12, and the end piece 16 mounted on the end 15 to rotate around the geometric axis 22 is also shown, and here the end piece 16 is in its holding position HS for the wiper squeegee 2. The end piece 16 is adapted to the form of the second end 15 of the support frame 1 and thereby formed in such a fashion that the outer surface 41 of the outer claw support 12 grades, directly and without a gap, into the outer surface 42 of the end piece 16. This is achieved essentially as follows; the edge 39 formed between the outer surface 41 and the front surface of the second end 15 of the support frame 1 is formed with a sharp edge. Also, the edge 40 (which is formed between the outer surface 42 of the end piece 16 and the outer surface of the second stop 17) directly opposite the edge 39, is also made with a sharp edge. The edges correspond in their design and directly adjoin one another.

Figure 7:
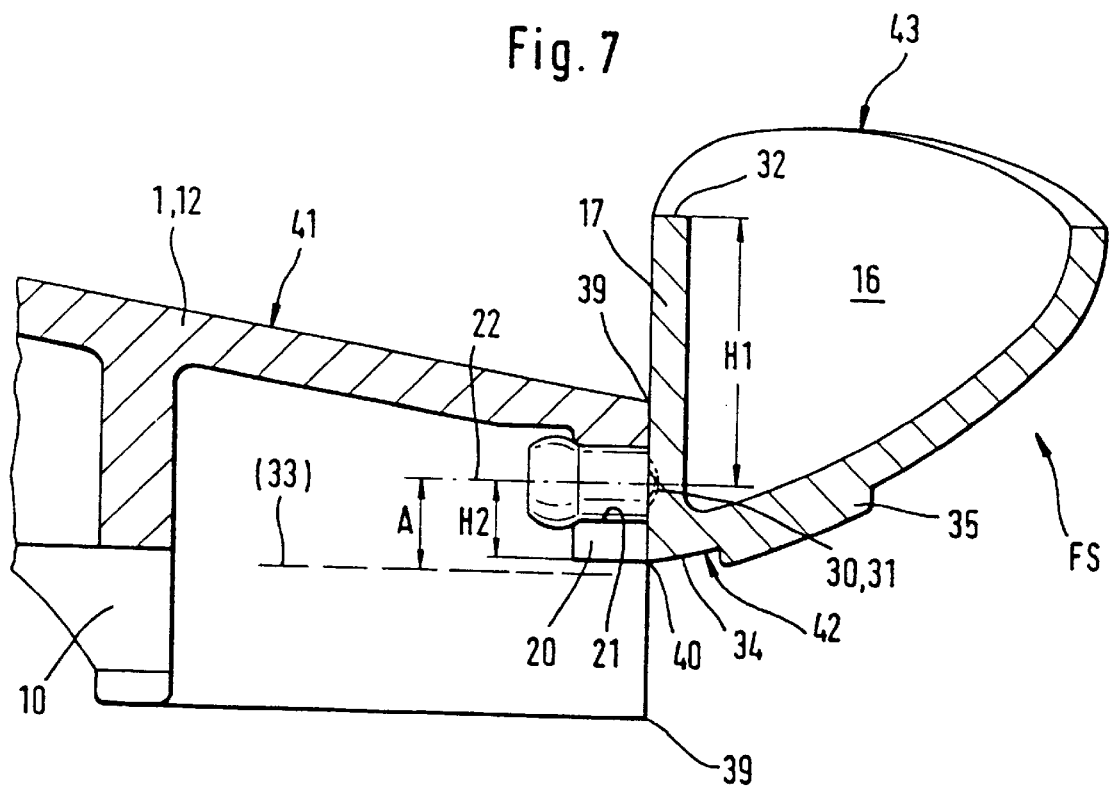
FIG. 7 shows a sectional view according to FIG. 6, but without the wiper squeegee, and with the end piece in the release position (FS)

It can also be seen FIGS. 6 and 7 that the underside 43 of end piece 16 has a convex shape. The wall of end piece 16 is thus curved downward in an arch, so that the bristles of a carwash machine can slide off sideways and not unintentionally move end piece 16 from the holding position HS into release position FS.

Figure 6A:
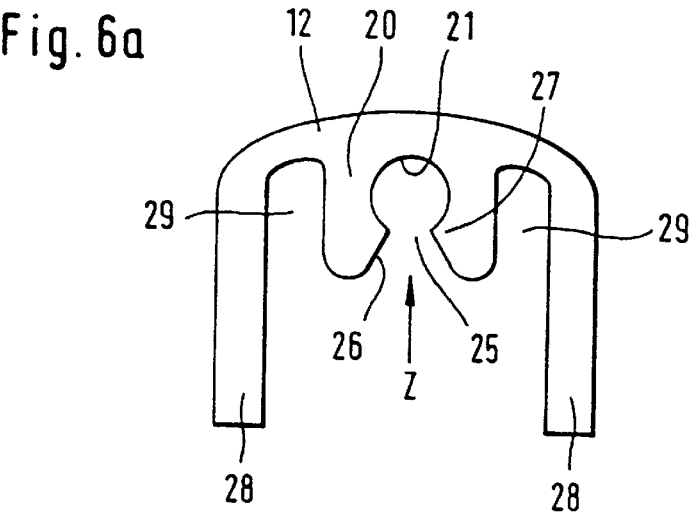
FIG. 6a shows a detail of FIG. 6.

Stop 17 is essentially an outer wall of the end piece 16 running transversely to the longitudinal direction L of the wiper squeegee, and in principle it is a hollow body open downwards. The second stop 17 is thus connected in one piece with the end piece 16 manufactured of plastic. A hinge pin 23 stands out at right angles from the stop 17, and its free end is developed into a thickening 24 in the form of a spherical washer. This hinge pin 23 is also a component of the end piece 16. The hinge pin 23 is mounted in the through-hole 21 of the rib 20 to rotate around the geometric axis 22. The thickening 24 protrudes from the through-hole 21 on the inner side of the rib 20 and prevents the hinge pin 23 from sliding out of the through-hole 21 in the direction of the geometric axis 22. In order to be able to connect the end piece 16 with the second end 15 of the support frame or of the outer claw support 12 in a simple assembly procedure, the through-hole 21 is open radially downward. FIG. 6a shows that this radial opening 25 is fitted with opposing insertion bevels 26 and locking projections 27. For fastening the end piece 16 onto the second end 15, the hinge pin 23 is pushed into the through-hole 21 in the direction of the arrow Z. The locking projections give way elastically, and after the hinge pin 23 has passed through, they return to their initial position. The end piece 16 is thus held on the support frame without danger of loss. So that the locking projections 27 have sufficient elastic mobility during the assembly of the end piece 16, between the rib 20 and the side walls 28 of the claw support 12, a free punch is provided.

The end piece 16 must at least be locked in its holding position (HS). In order to make possible an automatic creation or release of such a lock, a catch is provided which is effective both in the holding position (HS) (FIG. 7) as well as in the release position (FS) which is rotated from that by 180°. To produce the lock, on the front side of the rib to the left and right of the through-hole 21 and therefore diametrically opposite with respect to the geometric axis 22, a locking projection 30 of the ball-and-socket type is integrally molded (see also FIG. 5). Two appropriate recesses are associated with these ball-and-socket type locking projections 30, and these recesses are placed on the outside of the stop 17; this outside directly adjoins the rib 20. The locking projections 30 and the associated recesses 31 are dimensioned so that the locking connection can be released by turning the end piece 16, because of the elastic properties of the materials, but nevertheless a sufficiently secure lock is produced to prevent an automatic release of the locking connection during operation of the windshield wiper.

In the holding position HS, the stop 17 stands at the second end 15 of the support frame 1 opposite the end face of the wiper squeegee 2, especially at the head piece 18 of the wiper squeegee 2 and thus limits its capability of shifting in the longitudinal direction L. FIG. 6 shows a small interval a between the second stop 17 and the front side of the head piece 18 of the wiper squeegee 2. To the specialist it should be clear how great the distance in the longitudinal direction L of the wiper squeegee must be by which the wiper squeegee can be shifted before it strikes against the first stop 14 or the second stop 17. On the other hand this distance also should be no greater than necessary.

FIG. 6 shows that the second stop 17 is set up at right angles to the geometric axis 22. Its height H1 between the geometric axis 22 and the underside 32 of the second stop 17 is greater than the distance A between the geometric axis 22 and the upper side 33 of the wiper squeegee 2. This ensures that the second stop 17 securely limits the shifting capability of the wiper squeegee 2 in its longitudinal direction L and thus prevents the wiper squeegee from sliding out of the holding claws 10 of the support frame 1. The height H2 between the geometric axis 22 and the upper side 34 of the second stop 17 or of the end piece 16 is smaller than the height H1 and also smaller than or at most equal to the distance A between the geometric axis 22 and the upper side 33 of the wiper squeegee 2.

Through an optimal adaptation of the position of the geometric axis 22 and the heights H1 and H2 of the end piece 16, along with the guarantee of more reliable functioning, there is also a guarantee that the end piece 16 harmoniously adjoins the second end 15 of the support frame 1 or of the claw support 12.

The significance of the height H2 of the second stop 17 or of the end piece 16 can be seen in FIG. 7. The height H2 ensures that when the end piece 16 is in the release position FS, the wiper squeegee 2 can be withdrawn in its longitudinal direction L from the support frame in an uncomplicated manner. Naturally, this also makes possible an equally uncomplicated shifting in, in the opposite direction, of a new wiper squeegee 2 into the holding claws 10 of the support frame 1. Here it is obvious that the rib 20 also must end at least shortly above the upper side 33 of the wiper squeegee 2. In FIG. 7 the end piece 16 assumes the release position FS, which is rotated by 180° from the holding position HS around the geometric axis 22.

In order that replacement of wiper squeegee 2 can also be performed simply by a nonprofessional and requires no special instruction, on the upper side 34 of the end piece 16 a mark 35 is provided which allows one to see on which end of the wiper blade the second stop 17 (movable between its holding position HS and release position FS) is located. In the present case, this mark 35 is designed in the form of a double arrow, which indicates the direction of rotation of the end piece. In order that this mark 35 also remain permanent and be clearly recognizable even under the action of environmental factors or dirt, it is made with raised characters (in relief).

Figure 8:
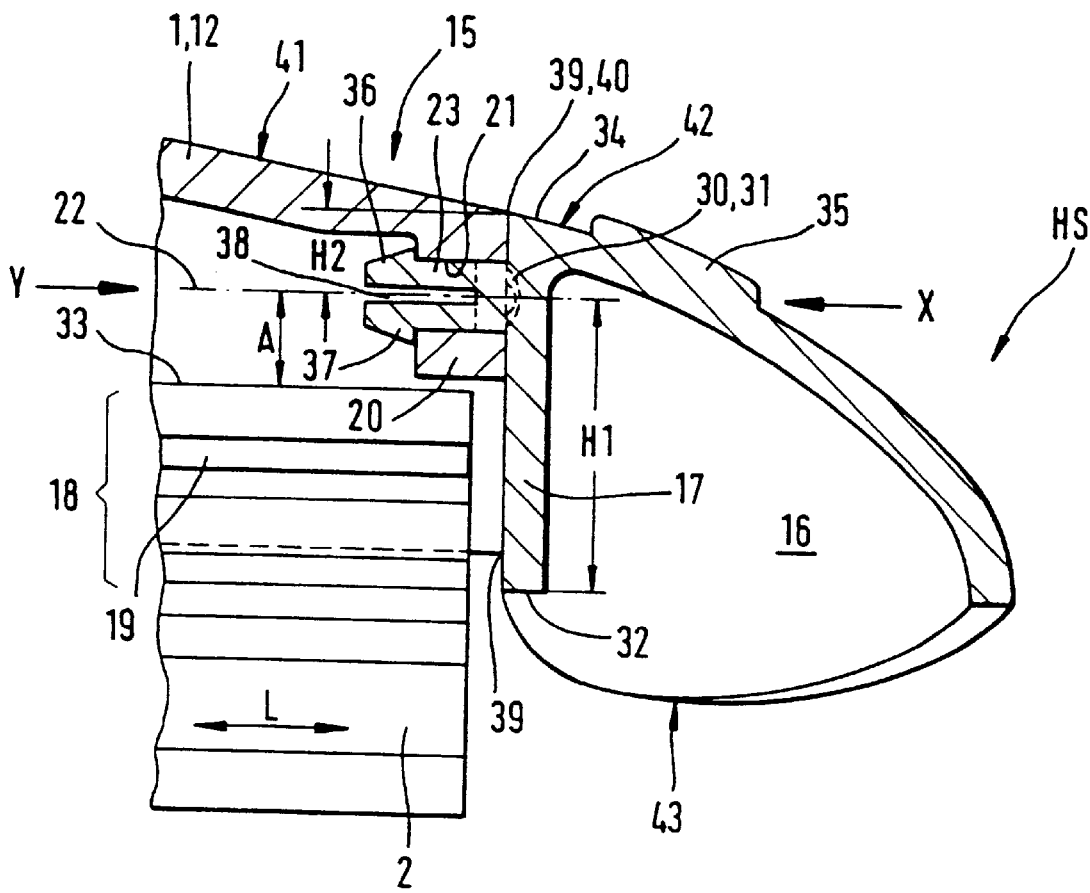
FIG. 8 shows a longitudinal section of another example of an embodiment of the second end of the support frame.

For the example of the embodiment shown in FIG. 8, essentially the same description holds as for the example of the embodiment according to FIGS. 5 through 7, and in principle, the same reference numbers are used. Accordingly in the description of the example of the embodiment according to FIG. 8, essentially only the different developments or functions will be discussed.

Figure 8A:
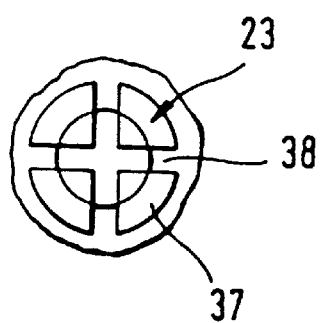
FIG. 8a shows another example of an embodiment of the hinge pin of the end piece as seen in the Y direction according to FIG. 8.
Figure 8B:
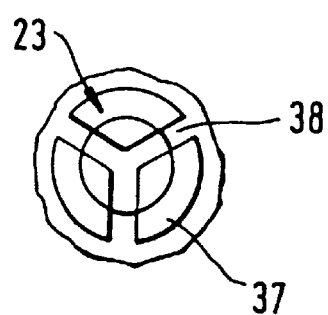
FIG. 8b shows yet another example of an embodiment of the hinge pin of the end piece as seen in the Y direction according to FIG. 8.

The significant difference is the following: the through-hole 21 placed coaxially to the geometric axis 22 in the rib 20 is closed all around. In order to be able to fasten the end piece by means of an assembly process as simple as possible, but nevertheless in a stable and loss-proof manner to the second end 15 of the support frame 1 or of the outer claw support 12, the hinge pin 23 has been formed somewhat differently. At its free end the hinge pin 23 has a conical thickening 36, which is formed as the stop means. As FIG. 8 shows, the conical thickening 36 on the inside of the rib 20 protrudes out of through-hole 21 and grips with hook-shaped locking segments 37 the inside of the rib 20 at the edge of the through-hole 21; so that hinge pin 23, for fastening the end piece 16 onto the second end 15 of the support frame 1 can be inserted simply in the direction of the arrow X into the through-hole 21, the hinge pin 23 is provided with appropriate yielding slits 38. These yielding slits 38 are placed on the hinge pin 23 axially from its end face axially. These yielding slits 38 are here so arranged and so wide, that the locking hooks 37 can be moved by spring elasticity so far against each other that the conical thickening 36 can be put through the through-hole 21 in the axial direction without problems. After the insertion of the hinge pin 23 and after this has reached its final position in the through-hole 21, the locking segments 37 spring back into their initial position and again grip the edge of the through-hole 21 on the inside of the rib 20. FIGS. 8a and 8b show two different possibilities for the arrangement of the yielding slits 38 in the hinge pin 23. For the example of the embodiment in FIG. 8a, they are arranged in cross formation, and for the example of the embodiment shown in 8b, they are arranged in a Y.

What is claimed is:

1. A wiper blade with an elongate replaceable wiper squeegee for an automotive windshield wiper, the squeegee having a head piece which is held by holding claws, in a manner to shift freely in a longitudinal direction relative to the holding claws under a support frame belonging to the wiper blade, wherein longitudinal shifting of the wiper squeegee is limited by a first stop and a second stop, which abut a first and a second end, respectively, of the wiper squeegee, the first stop being rigidly fastened to a first end of the support frame and the second stop being mounted on a special end piece which is fastened onto a second end of the support frame in a manner to rotate about a geometric axis running at least approximately parallel to the longitudinal direction of the wiper squeegee in such a fashion that it can optionally be brought into a holding position or into a release position with respect to the wiper squeegee and can be locked at least in the holding position.

2. The wiper blade according to claim 1, wherein the end piece with the second stop is complementary in form with the second end of the support frame and at least largely corresponds in form to the first end of the support frame with the first stop.

3. The wiper blade according to claim 1, wherein an edge formed on the second end of the support frame between an outer surface and a front surface, as well as an opposite edge formed between an outer surface and a front surface of either element out of the group consisting of the end piece and the second stop are formed as sharp edges, so that in the holding position of the end piece, the outer surface of the second end of the support frame passes over into the outer surface of the end piece directly and without a gap.

4. The wiper blade according to claim 1, wherein the end piece has a convex underside.

5. The wiper blade according to claim 1, wherein the support frame of the wiper blade and the end piece are made of plastic and the first stop is molded in one piece onto the first end of the support frame and the second stop is molded in one piece onto the end piece.

6. The wiper blade according to claim 1, wherein the end piece is connected with a locked connection to the second end of the support frame.

7. The wiper blade according to claim 1, wherein the geometric axis runs centrally above the wiper squeegee, and the second stop extends at a right angle to the geometric axis.

8. The wiper blade according to claim 7, wherein the second stop or the end piece can be brought from the holding position into the release position, or vice versa, by rotating through 180° around the geometric axis.

9. The wiper blade according to claim 8, wherein the squeegee has an upper side and the second stop has an upper side and an underside, the distance of the underside to the geometric axis being greater than the distance between the geometric axis and the upper side of the wiper squeegee, and wherein the distance between upper side and underside of the second stop is smaller than the distance between the geometric axis and the upper side of the wiper squeegee.

10. The wiper blade according to claim 7, wherein a rib is mounted on the second end of the support frame transversely to the longitudinal direction of the wiper squeegee, and the end piece is connected to this rib so as to rotate around the geometric axis.

11. The wiper blade according to claim 10, wherein the end piece is connected to the second end of the support frame by a hinge pin which is mounted in a through-hole.

12. The wiper blade according to claim 11, wherein the hinge pin engages the through-hole and wherein a free end of the hinge pin protruding out of the through-hole is thickened.

13. The wiper blade according to claim 12, wherein the through-hole is in the rib and has a radial opening allowing the hinge pin to be introduced in a locking fashion into the through-hole.

14. The wiper blade according to claim 12, wherein the through-hole is in the rib and has a closed circumference, and the hinge pin is provided with axially placed yielding slits, so that the hinge pin can be placed in an engaged manner in the through-hole in an axial direction.

15. The wiper blade according to claim 1, wherein the locking of the end piece in the holding position is accomplished by a locking mechanism.

16. The wiper blade according to claim 15, wherein the locking mechanism is formed by at least one ball-and-socket projection and corresponding associated recesses, which are placed in appropriate positions on one of the elements out of the group consisting of ribs adjoining one another on the second end of the support frame, rib of the end piece, and second stop of the end piece.

17. The wiper blade according to claim 16 with holding position and release position located at 180° from one another, wherein, when viewed in the direction of the geometric axis, two ball-and-socket projections and their associated corresponding recesses are placed diametrically opposite to one another left and right along the geometric axis.

18. A wiper blade with an elongate replaceable wiper squeegee for an automotive windshield wiper, the squeegee held by holding claws in a manner allowing free shifting in a longitudinal direction relative to the holding claws under a support frame belonging to the wiper blade, comprising:

at least one rotatable stop for limiting longitudinal shifting of the wiper squeegee, the stop abutting one end of the wiper squeegee, the stop being mounted on an end piece fastened onto one end of the support frame allowing rotation between a holding position and a release position with respect to the wiper squeegee about a geometric axis running at least approximately parallel to the longitudinal direction of the wiper squeegee.

19. The wiper blade of claim 18 further comprising the end piece being lockable at least in the holding position.

20. The wiper blade of claim 18, further comprising the end piece complementary to the one end of the support frame and at least largely corresponding in form to an opposite end of the support frame.

21. The wiper blade of claim 18, further comprising:

an edge formed on the one end of the support frame between an outer surface and a front surface; and an opposite edge formed between an outer surface and a front surface of either element out of the group consisting of the end piece and the stop are formed as sharp edges, so that in the holding position of the end piece, the outer surface of the one end of the support frame passes over into the outer surface of the end piece directly and without a gap.

22. The wiper blade of claim 18, wherein the end piece has a convex underside.

23. The wiper blade of claim 18, wherein the support frame of the wiper blade and the end piece are made of plastic and the stop is molded in one piece onto the end piece.

24. The wiper blade of claim 18, wherein the end piece is connected with a locked connection to the one end of the support frame.

25. The wiper blade of claim 18, wherein the geometric axis runs centrally above the wiper squeegee, and the stop extends at a right angle to the geometric axis.

26. The wiper blade of claim 25, wherein the stop or the end piece can be brought from the holding position into the release position, or vice versa, by rotating through 180° around the geometric axis.

27. The wiper blade of claim 26, wherein the squeegee has an upper side and the stop has an upper side and an underside, the distance of the underside to the geometric axis being greater than the distance between the geometric axis and the upper side of the wiper squeegee, and wherein the distance between upper side and underside of the stop is smaller than the distance between the geometric axis and the upper side of the wiper squeegee.

28. The wiper blade of claim 25, wherein a rib is mounted on the one end of the support frame transversely to the longitudinal direction of the wiper squeegee, and the end piece is connected to this rib so as to rotate around the geometric axis.

29. The wiper blade of claim 28, wherein the end piece is connected to the one end of the support frame by a hinge pin which is mounted in a through-hole.

30. The wiper blade of claim 29, wherein the hinge pin engages the through-hole and wherein a free end of the hinge pin protruding out of the through-hole is thickened.

31. The wiper blade of claim 30, wherein the through-hole is in the rib and has a radial opening of such a nature that the hinge pin can be introduced in a locking fashion into the through-hole.

32. The wiper blade of claim 30, wherein the through-hole is in the rib and has a closed circumference, and the hinge pin is provided with axially placed yielding slits, so that the hinge pin can be placed in an engaged manner in the through-hole in an axial direction.

33. The wiper blade of claim 18, wherein the locking of the end piece in the holding position is accomplished by a locking mechanism.

34. The wiper blade of claim 33, wherein the locking mechanism is formed by at least one ball-and-socket projection and corresponding associated recesses, which are placed in appropriate positions on one of the elements out of the group consisting of ribs adjoining one another on the one end of the support frame, rib of the end piece, and stop of the end piece.

35. The wiper blade of claim 34 with holding position and release position located at 180° from one another, wherein, when viewed in the direction of the geometric axis, two ball-and-socket projections and their associated corresponding recesses are placed diametrically opposite to one another left and right along the geometric axis.

* * * * *